United States Patent [19]

Chakraborty

[11] Patent Number: 5,512,327
[45] Date of Patent: Apr. 30, 1996

[54] PROCEDURE FOR PRODUCING A HIGHLY POROUS CATALYST LAYER CONSISTING OF A PALLADIUM OR PLATINUM ALLOY

[75] Inventor: Amiya K. Chakraborty, Erftstadt, Germany

[73] Assignee: Gesellschaft fur Anlagen-und Reaktorsicherheit (GRS) mbH, Cologne, Germany

[21] Appl. No.: 337,058

[22] Filed: Nov. 10, 1994

[30] Foreign Application Priority Data

Nov. 11, 1993 [EP] European Pat. Off. ............. 93118283

[51] Int. Cl.⁶ ..................................................... B05D 1/08
[52] U.S. Cl. ........................... 427/455; 427/456; 427/191; 427/192; 427/205; 507/326; 507/330; 507/331
[58] Field of Search ..................................... 427/455, 456, 427/205, 191, 192, 405, 383.1, 383.7; 502/326, 330, 331

[56] References Cited

U.S. PATENT DOCUMENTS 3,627,561 12/1971 Richards .................................. 427/455
4,563,566 1/1986 Reents .................................. 219/121 PB

FOREIGN PATENT DOCUMENTS 1314277 3/1993 Canada .
0172280 2/1986 European Pat. Off. .
0301536 2/1989 European Pat. Off. .
0503470 9/1992 European Pat. Off. .
3638520 5/1988 Germany .
832031 4/1960 United Kingdom .

OTHER PUBLICATIONS

Thermal Spraying: Practice, Theory, and Application, American Welding Society, Inc. 1985, p. 42.

Primary Examiner—Shrive Beck
Assistant Examiner—Katherine A. Bareford
Attorney, Agent, or Firm—Thomas A. Gallagher; David N. Lathrop

[57] ABSTRACT

A method is described for producing a catalyst layer consisting of a metal alloy with palladium or platinum as the primary meal and at least one other meal which has a melting point lower than that of the primary meal and which forms with the primary metal homogeneous mixed crystals that are rich in the primary metal. In the method, a powder of the at least one other metal is applied first to a carrier body followed by application of a powder of the primary metal. The powders are successively applied to the carrier body in this order, with at least the powder of the primary metal being sprayed on by thermal means.

16 Claims, 1 Drawing Sheet

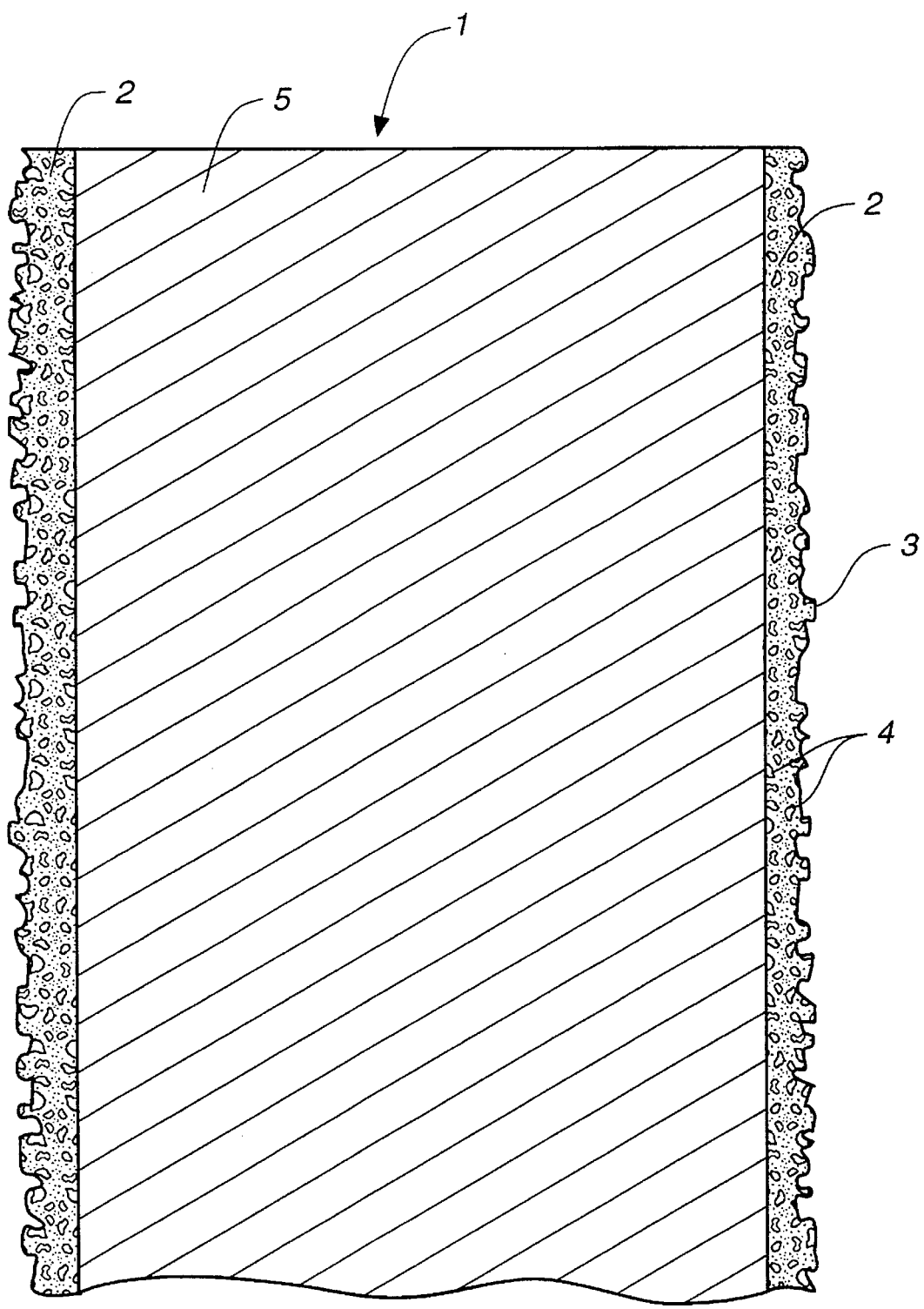
FIG._1

PROCEDURE FOR PRODUCING A HIGHLY POROUS CATALYST LAYER CONSISTING OF A PALLADIUM OR PLATINUM ALLOY

TECHNICAL FIELD

The invention concerns a procedure for producing a catalyst layer consisting of a metal alloy coated on a carrier body.

BACKGROUND ART

From DE-A 37 25 290 and from EP-A-0 301 536 it is known that ternary alloys with palladium as the primary metal, another metal from Group VIII of the periodic system, especially nickel, and copper are suitable as a contact catalyst for the oxidation of hydrogen in an atmosphere containing hydrogen and oxygen. A ternary alloy made up of at least 89% by weight of Pd, a maximum of 10% by weight of Ni, and a maximum of 1% by weight of Cu, or in particular 95% by weight of Pd, 4% by weight of Ni, and 1% by weight of Cu, is disclosed in these references as a preferred composition. Such catalysts, in the form of carrier bodies coated with the catalytic alloy, are used in nuclear power plants, for example, where in certain accident situations large amounts of hydrogen are liberated that can be removed with the aid of such catalysts in order to prevent the generation of explosive gas mixtures. However, the problem of removing hydrogen from a gas mixture containing hydrogen and oxygen in order to prevent the danger of an explosion arises in other situations as well, for example in connection with garbage incineration.

From DE-A-36 38 520 a procedure is known for producing a so-called skeleton catalyst or Raney catalyst, in which a mixture of materials in powder form is applied to a carrier element by thermal spraying, with this mixture containing a catalytically effective component and a component that is soluble in an alkaline solution or acid. The soluble component is subsequently dissolved out of the previously applied layer by means of an acid or alkaline solution. The coating can be applied in stages, with a different powder composition each time, so that the innermost layer contains no or only a small portion of the soluble component, whereas in the outermost layer the portion of soluble component is considerably greater than that of the catalytically effective component. In this prior art, the thermal spraying technique is supposed to improve in a simple way the adhesion of the catalytic layer to the carrier element. The dissolving out of the soluble component in the thermally sprayed-on layer makes this technique very troublesome and, depending on the material of the catalytically active component, it can lead to a situation where a chemical reaction takes place with the latter that can impair the catalytic effect.

From EP-A 0 503 470 a procedure is known for producing a metallic catalyst layer on a carrier material, in which Pd, Pt, or a PdNi alloy is applied to a carrier material by means of plasma spraying or flame spraying for the purpose of creating a porous catalyst layer. In this process the carrier material can be preheated before the plasma or flame spraying, and after being coated it can be heat-treated in an atmosphere of hydrogen and an inert gas.

From GB-A-832 031 it is disclosed how to use a two-stage flame spraying procedure in order to produce a catalyst of the platinum group. In this process, first of all aluminum oxide or zirconium oxide is applied by flame spraying to a carrier made of a material with a high melting point, such as silicon carbide, in order to create a rough surface with good adhesive properties. Then likewise by flame spraying the catalyst material, in the form of platinum or a platinum alloy, is applied.

From EP-A-0 172 280 yet another procedure is known for the production of a catalyst with a large surface area, in which the catalyst material proper together with another material is applied to a carrier by means of co-sputtering. The carrier is a substrate consisting of particles, especially those of high-melting oxides, nitrides, or carbides. A composite thin film is sputtered on this substrate, with this film consisting of one or more catalytically active metals such as Pt, Pd, Ag, Au, Re, Rh, Ru, and Ir, and a simultaneously sputtered-on carrier material, namely an oxide, nitride, or carbide.

It is generally known that one prerequisite for high activity in a contact catalyst is a large surface area that can be easily reached; namely, what matters is a fine dispersion and/or an extensive porosity on the part of the catalytically effective material, as is found, for instance, in familiar spongy platinum. If on the other hand the catalytically effective material is disposed in the form of a coating on a carrier body, a good adhesion of the coating to the carrier body is of great importance. Small spalled flakes of a catalyst material used, for example, for the oxidation of hydrogen could reach a temperature leading to the ignition of the surrounding gas mixture because of the exothermic nature of the catalytic reaction. But there are enormous practical difficulties involved in attempting to produce a good adhesion at the same time as a large surface area.

The catalytic effect of a catalyst is greater the higher its temperature is, although of course this must remain below the ignition temperature of a surrounding gas mixture. In the oxidation between hydrogen and oxygen, the catalyst heats up until it reaches an equilibrium state where the heat generated is equal to the heat dissipated by radiation and convection. The time that elapses from the commencement of the catalytic effect to the reaching of this equilibrium state depends, among other things, on the total catalytically active surface area, the superficial extent of the carrier body, which as a rule is metallic, and the total mass or thermal capacity. The larger the superficial extent of the carrier body and the larger its mass, the longer it takes to reach the equilibrium state and the desired working temperature of the catalyst. Therefore, in order to achieve a fast response rate on the part of the catalyst, which is essential especially when it is used, as mentioned above, for the purpose of defusing accident or malfunction situations, the total catalytically effective surface area should be as large as possible in comparison with the superficial extent and mass of the carrier body.

The problem solved by the invention is to develop a procedure that makes it possible to create in a simple way a catalyst layer consisting of a metal alloy that adheres tightly to a carrier body and that has a very large active surface area.

SUMMARY OF INVENTION

This problem is solved on the basis of the invention by a procedure for forming a metal alloy of palladium or platinum as the primary metal, the alloy comprising a homogeneous solid solution of the primary metal and one or more other metals.

Additional features of the invention are set forth.

The procedure on the basis of the invention makes it possible to produce in a simple way a catalyst layer of very high porosity that adheres very tightly to a carrier body. The metals Pd and Pt form a solid solution with other metals, for example Au, Cu, Ag, Ni, or Pb. With relatively small additions of one or more of these other metals, the catalyzing ability of palladium or platinum is retained within the solid solution region. For example, an alloy containing 4% by weight of Ni and 1% by weight of Cu, with the rest being Pd, is distinctive for its very good catalyzing ability. Compared to pure Pd, these alloys are considerably more stable. Following a relatively long aging in an air-containing atmosphere, palladium-rich alloys such as Pd—Ni—Cu, Pd—Ag—Ni, and Pd—Au—Ni are far less vulnerable with respect to catalyst poisons such as CO because of the Ni contained in them. In this case, a reaction between CO and Ni causes the chemical compound $Ni(CO)_4$ to be formed, and therefore the CO is removed from the atmosphere to be catalyzed.

The present invention is based on the recognition and utilization of the fact that the added metals for the mentioned binary and ternary palladium and platinum alloys have a distinctly lower melting point than that of the primary metal palladium or platinum. Whereas, for example, pure palladium has a melting point of 1550° C., the melting points of Ag at 961° C., of Cu at 1050° C., and of Au at 1064° C. lie below this by about 500° C. or more.

In thermal spray-coating such as plasma or flame spraying or a laser process, powdered mixtures of the alloy metals are sprayed onto the carrier body frown a nozzle pipe along with an inert gas such as argon or nitrogen. Thereby, the powder mixtures are changed into a liquid which precipitates on the carrier body. On the carrier body, diffusion and alloy formation take place at an elevated temperature. Because of its higher melting point, palladium is the first to change into a solid state after the precipitation on the carrier body, whereas the low-melting metal or metals remain longer in liquid form than the palladium. Since proportionately speaking much more palladium is present in the powder mixture, the palladium will surround and cover the low-melting metals. The liquid form of the low-melting-temperature metals takes up more volume than the solid form. Therefore, after contraction due to a transition to the solid state, pores and also channels connecting these pores are formed within the catalyst layer.

The elevated temperature present during the first phase of cooling promotes diffusion and alloy-building among the elements. The movement of the atoms gives rise to pores that in turn contribute to the porosity of the catalyst (Kirkendall Effect). The procedure based on the invention starts with powders of the individual alloy components, for example a Pd powder, a Ni powder, and a Cu powder, with grain sizes in the range between 0.1 and 1,000 μm. Preferred are grain sizes in the range of 20 to 60 μm, on the one hand because such powders can be easily prepared, and on the other because they lead to a good diffusion and homogenization. The carrier body is preferably a plate made of stainless steel with a thickness between 0.1 and 5 mm, preferably between 1 and 3 mm, with the thickness to be chosen in the individual case in relation to the requisite strength and in consideration of the thermal capacity. The thickness of the catalyst layer lies between 0.01 and 1 mm, preferably about 0.1 ram, and should not exceed roughly one tenth of the thickness of the carrier plate.

The grain size of the low-melting metal, namely copper in the case of a Pd—Ni—Cu alloy, has an effect on the structure of the finished catalyst layer. Grain sizes of about 100 to 500 μm give coarse, region-specific pores. On the other hand, a finer powder matched to the grain size of the Pd or Pt powder, thus preferably with a grain size between 20 and 60 μm, leads to fine, uniformly distributed pores with many interconnections within the catalyst layer. The temperature of the carrier body also affects the configuration of the pore size and pore distribution. Heating the carrier body slows down the cooling process for the catalyst layer that was thermally sprayed on the carrier body, and the bond between the material of the carrier body and the catalyst layer is strengthened. On the one hand, the slowing of the cooling process promotes the diffusion and homogenization of the catalyst layer and thus promotes a greater pore formation on account of the Kirkendall Effect. On the other hand, with a slowed cooling, the low-melting-temperature metal remains longer in liquid form and this in turn favors diffusion and pore formation.

Metallographic examinations made on cross sections of a catalyst produced in a manner according to the invention showed that an extensive diffusion zone was present between the catalyst layer and the carrier body, which leads to a strong bonding between the two. In addition, numerous pores of various sizes were seen within the catalyst layer.

Embodiments of the invention are explained in more detail below on the basis of the schematic drawings.

BRIEF DESCRIPTION OF DRAWINGS

The figure shows a cross-sectional view of a catalyst plate.

DETAILED DESCRIPTION OF INVENTION

The figure shows a cross-sectional view of catalyst plate 1, which consists of a plate 5 made of stainless steel as the carrier body that has been provided on both sides with a catalyst layer 2.

EXAMPLE 1 (comparison example)

To make such a catalyst plate a powder mixture consisting of 95% by weight of Pd, 4% by weight of Ni, and 1% by weight of Cu was applied to the carrier plate 5 using the flame-spraying technique. The catalyst layers were highly porous and showed considerable surface roughness 3. Pores 4 both near to and far from the surface were connected with one another and with the outside surface by a multitude of channels.

EXAMPLE 2

Copper powder with a grain size of about 100 μm was sprinkled on and uniformly distributed over the stainless-steel carrier plate 5. This powdered carrier plate was tempered in an argon atmosphere at 600° C. This prevented an oxidation of the copper at the surface of the carrier plate, and at the same time a diffusion and a bonding between the copper powder and the carrier plate took place. Subsequently a powder mixture made of Pd powder and Ni powder was applied to the carrier plate under an argon atmosphere in a flame-spraying process. The amounts of powder were adjusted to obtain an alloy composition of 95% by weight of Pd, 4% by weight of Ni, and 1% by weight of Cu.

EXAMPLE 3

In this example as well the copper was first applied to the stainless-steel carrier plate, but unlike Example 2 this was done by thermal spraying. Otherwise this example was equivalent to Example 2.

Alternatives

An alternative to the procedure in accordance with Example 3 is that instead of applying the powder mixture consisting of Pd and Ni powders in one step, these powders are separately applied in succession. From a repeated spraying the carrier plate is brought to a high temperature and is kept at this temperature for a while. As already mentioned, this promotes both diffusion and also the homogenization of the alloy elements. In addition the bonding between the catalytic layer and the material of the carrier plate is strengthened due to a repeated initiation of diffusion. The repeated diffusion thus brought about causes another effect. Because of the differing diffusion rates, more pores are created within the catalytic layer.

In the catalyst layers made according to Example 2 and Example 3, in which the low-melting Cu powder was applied to the carrier plate first, larger pores appeared than in catalyst layers made according to Comparison Example 1.

In all cases, after the thermal spray-on, the catalyst can be subjected to a stress-relief annealing process by tempering at relatively high temperatures. If the carrier body is warmed up during the application of the alloy elements and thereby the cooling-down process is slowed, the stress-relief annealing can be omitted.

Catalysts produced in accordance with the above Examples 2 and 3 were tested in a gas atmosphere containing hydrogen and air. They showed an outstanding catalyzing effect for the oxidation of hydrogen, and this effect was retained also for a long period of time. When they were later examined under the microscope, no spalling of the catalyst layer whatsoever could be detected.

I claim:

1. A method for producing a catalyst layer on a carrier body, said catalyst layer comprising a metal alloy of a primary metal and one or more other metals, said primary metal being either palladium or platinum, wherein said one or more other metals have respective melting points below that of said primary metal, said alloy comprising a homogeneous solid solution of said primary metal and said one or more other metals, said method comprising the steps of:

applying a first powder of said one or more other metals to said carrier, applying a second powder of said primary metal to said carrier body such that said second powder, while in liquid form, surrounds and covers discrete grains of said first powder while grains of said first powder are in liquid form so as to form said catalyst layer, and repeating successive application of said first powder and said second power if and as desired.

2. A method according to claim 1, wherein said other metals are from the group consisting of metals nickel, silver, copper and gold.

3. A method according to claim 1, wherein said metal alloy is a ternary alloy comprising said primary metal and two other metals, wherein said two other metals are from the group consisting of metal pairs nickel-copper, silver-nickel, gold-silver and gold-nickel.

4. A method for producing a catalyst layer on a carrier body, said catalyst layer comprising a metal alloy of a primary metal and two or more other metals, said primary metal being either palladium or platinum, each of said other metals having respective melting points below that of said primary metal, said alloy comprising a homogeneous solid solution of said primary metal and said two or more other metals, said method comprising the steps of:

applying to said carrier a first powder comprising at least one of said two or more other metals, applying to said carrier a second powder comprising said primary metal and all of said two or more other metals not included in said first powder such that said second powder, while in liquid form, surrounds and covers discrete grains of said first powder while grains of said first powder are in liquid form so as to form said catalyst layer, and repeating successive application of said first powder and said second powder if and as desired.

5. A method according to claim 4, wherein said other metals are from the group consisting of metals nickel, silver, copper and gold.

6. A method according to claim 4, wherein said metal alloy is a ternary alloy comprising said primary metal and two other metals, wherein said two other metals are from the group consisting of metal pairs nickel-copper, silver-nickel, gold-silver and gold-nickel.

7. A method according to any one of claims 1 through 6, wherein said first powder is applied to said carrier body by sprinkling said first powder on said carrier body, said first powder having grain sizes in the range from 0.1 to 1000 µm, and then tempering in an inert atmosphere, and wherein said second powder is applied to said carrier body by thermal spraying.

8. A method according to claim 7, wherein said carrier body is heated during thermal spraying.

9. A method according to claim 8, wherein said first powder is more coarsely grained than said second powder.

10. A method according to claim 7, wherein said first powder is more coarsely grained than said second powder.

11. A method according to claim 7 wherein grain sizes of said first powder are in the range from 20 to 60 µm.

12. A method according to any one of claims 1 through 6, wherein said first powder is more coarsely grained than said second powder.

13. A method according to any one of claims 1 through 6, wherein said first powder is applied to said carrier body by thermal spraying and said second powder is applied to said carrier body by thermal spraying.

14. A method according to claim 13, wherein said carrier body is heated during thermal spraying.

15. A method according to claim 14, wherein said first powder is more coarsely grained than said second powder.

16. A method according to claim 13, wherein said first powder is more coarsely grained than said second powder.

* * * * *